United States Patent
Ntofon et al.

(10) Patent No.: US 10,574,743 B1
(45) Date of Patent: Feb. 25, 2020

(54) RESOURCE ALLOCATION

(71) Applicant: BRITISH TELECOMMUNICATIONS PUBLIC LIMITED COMPANY, London (GB)

(72) Inventors: Okung Ntofon, London (GB); Gilbert Owusu, London (GB); Siddhartha Shakya, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 15/535,852

(22) PCT Filed: Dec. 8, 2015

(86) PCT No.: PCT/EP2015/078955
§ 371 (c)(1),
(2) Date: Jun. 14, 2017

(87) PCT Pub. No.: WO2016/096534
PCT Pub. Date: Jun. 23, 2016

(30) Foreign Application Priority Data

Dec. 16, 2014 (EP) .................................. 14275259

(51) Int. Cl.
*G06F 15/173* (2006.01)
*H04L 29/08* (2006.01)
*G06F 9/50* (2006.01)

(52) U.S. Cl.
CPC ........ *H04L 67/1012* (2013.01); *G06F 9/5077* (2013.01); *H04L 67/30* (2013.01); *H04L 67/322* (2013.01); *H04L 67/327* (2013.01)

(58) Field of Classification Search
CPC ..... G06F 9/5077; H04L 67/30; H04L 67/322; H04L 67/327; H04L 67/1012

(Continued)

(56) References Cited

U.S. PATENT DOCUMENTS

2012/0131594 A1   5/2012   Morgan
2013/0268672 A1  10/2013   Justafort et al.
(Continued)

FOREIGN PATENT DOCUMENTS

CN    103559089    2/2014

OTHER PUBLICATIONS

Famaey J et al "Network-aware service placement and selection algorithms on large scale overlay Netw". (Year: 2011).*
(Continued)

*Primary Examiner* — Frantz B Jean
(74) *Attorney, Agent, or Firm* — Nixon & Vanderhye P.C.

(57) ABSTRACT

As data processing requirements of individual client systems A to K change over time, they are allocated service from physical datacentres X, Y, Z according to the existing capabilities of the data centres requirements of the client systems, thus transferring client systems between cells controlled by individual data centres. This avoids the complex process of adapting the individual physical datacentres' capabilities to the changing requirements of the client systems to which they were originally allocated: thus the capabilities, and not the mappings, are maintained and the mappings, not the capabilities, are dynamic, so as to optimise the allocation of client systems to cells. It also minimises the number of clients having to work to more than one datacentre, which leads to delays in processing as the datacentres need to communicate with each other.
Configuration of the datacentres X, Y, Z themselves is required to set up the system, but subsequently only if a re-optimization of the existing mappings cannot satisfy the changed demand profiles, for example because the overall balance of services available from the datacentres no longer matches the services required.

8 Claims, 6 Drawing Sheets

(58) Field of Classification Search
USPC .......................................................... 709/226
See application file for complete search history.

(56) References Cited

U.S. PATENT DOCUMENTS

2014/0108639 A1* 4/2014 Nelke ................. H04L 41/5051
709/224
2014/0136571 A1 5/2014 Bonvin et al.

OTHER PUBLICATIONS

Prevost et al.,"Optimal update frequency model for physical machine state change and virtual machine placement in the cloud", Proc. of the 2013 8th International Conference on System of Systems Engineering, Jun. 2, 2013 IEEE, 159-164 ISBN 978-1-4673-5596-4 ; ISBN 1-4673-5596-8, Jun. 2-6, 2013 (6 pgs.).
Xin Li et al., "QoS-Aware Service Selection in Geographically Distributed Clouds" 22nd International Conference on Computer Communication and Networks (ICCCN), Jul. 30, 2013 IEEE, 1-5, 2013 (5 pgs.).
International Search Report for PCT/EP2015/078955 dated Feb. 10, 2016, 4 pages.
Written Opinion of the ISA for PCT/EP2015/078955 dated Feb. 10, 2016, 7 pages.
Famaey et al., "Network-aware service placement and selection algorithms on large-scale overlay networks", *Computer Communications*, vol. 34, No. 15, Mar. 27, 2011, pp. 1777-1787.

* cited by examiner

RESOURCE ALLOCATION

This application is the U.S. national phase of International Application No. PCT/EP2015/078955 filed Dec. 8, 2015 which designated the U.S. and claims priority to EP Patent Application No. 14275259.1 filed Dec. 16, 2014, the entire contents of each of which are hereby incorporated by reference.

BACKGROUND AND SUMMARY

This invention relates to allocation and provisioning of resources in a telecommunications network, and in particular optimisation of service cell allocation in a virtualised ("cloud-based") datacentre system. However, although the embodiments of the invention will be described with reference to such a cloud-based system, the allocation and provisioning process may have applications in wider fields and no limitation of the scope of the invention is implied by discussion of details of the embodiments.

The provision of cloud-based datacentre services allows enterprises to be offered complete virtual datacentres with data processing resources such as computing, storage, and image processors etc. as on-demand services which are accessible on-the-fly, allowing the management of networked IT infrastructures, and complex associated data handling services, to be managed on behalf of an end-user (client) by a skilled resource-management specialist or "cloud service provider".

The cloud service providers distribute their datacentres across geographical locations to increase performance and reliability, and to reduce service delivery costs. Cloud service providers must optimize the deployment of services to take full advantage of these geo-distributed cloud infrastructures. This requires cloud service providers to determine in which of their physical cloud service provider datacentres to locate individual virtual datacentre components, how many virtual datacentre components to deploy on each physical cloud service provider datacentre, and how to optimally route traffic between enterprise customers and physical cloud service provider datacentres.

The complexity of this problem increases if there are dependencies that need to be taken into consideration. Such dependencies exist at different granularities in cloud infrastructures. There are dependencies at the service level in cloud-based service-oriented application (SOA) environments where multiple individual applications or services such as file hosting, e-commerce, and search engines are coupled together to create a single composite cloud service such as an online sales portal. There are also dependences at a higher granularity in situations where multiple virtual datacentre components such as computing, storage and image processor virtual machines are coupled together to deliver complete virtual datacentres.

The initial deployment of resources is usually planned so that each enterprise customer only needs to communicate with one virtual datacentre, which is then configured according to the customer's requirements for data storage, computing power, etc. This allows for efficient communication between the elements of the virtual datacentre, and reduced latency. Examples of such systems are discussed in general terms in United States patent application US2014/108639 and an article by Famaey et al: "Network-Aware service placement and selection algorithms on large-scale overlay networks" [*Computer Communications* Vol 34 No 15 pages 1777-1787 published in 2011.

A process that delivers such results is depicted in FIG. 4, and will be discussed in more detail later. The process allocates each client system to one of the datacentres, thereby forming a number of "virtual service cells", each served by a physical datacentre, as depicted in FIG. 2.

A problem arises when the requirements of individual client systems change over time. The initial selection of a physical datacentre to serve a given customer is followed by configuration of that physical datacentre to meet the customer's requirements: for example the relative proportions of the physical datacentre to be dedicated to storage, computing, image processing etc. that comprise the virtual datacentre to be delivered to the customer. As the customer requirements change, so the resources of the physical datacentre may have to be modified to accommodate the changes in these virtual datacentre requirements. Prior art solutions have required the client's primary physical datacentre capacities to be supplemented by additional service capacity provided by another physical datacentre if new requests cannot be fulfilled by the primary physical datacenter, thus creating a "virtual datacenter" serviced by multiple physical datacentres. However, this leads to communications inefficiencies and additional latency (delay) as data has to be exchanged between multiple physical datacentres to service individual requests.

Traditional approaches for delivering cloud-based services implement continuous reconfiguration of services or virtual datacentre components in response to changing demand profiles, for example by repeating the process depicted in FIG. 4, to meet these changing requirements. These approaches are usually expressed as optimization problems with objectives to minimize the perceived application-level latency (response time), minimize the total monetary costs of delivering cloud-based services, or minimize the total network distance (customer-to-datacentre, datacentre-to-datacentre, and application-to-application in the case of SOA). Heuristic implementations include randomly configuring cloud-based services across available physical cloud service provider datacentres, and configuring all cloud-based services offered by a cloud service provider on all physical cloud service provider datacentres. However, reconfiguration requires setup, migration (maintaining and transferring virtual machine state and data), and teardown of cloud-based services, and this is a complex process, and may require shut-down and/or the availability of temporary storage whilst the reconfiguration takes place. It is therefore desirable to avoid having to reconfigure the networked elements.

According to a first aspect of the invention, there is provided a method of controlling a distributed infrastructure comprising a plurality of client systems, and a plurality of physical data-processing resources organised to operate as a plurality of virtual datacentres, each virtual datacentre being configured with a respective set of service capabilities, the method comprising the steps of analysing a demand profile for each client system and allocating each client system to be handled by one of the virtual datacentres according to the service capabilities of the respective datacentres, wherein in the event of changes to the demand profiles of one or more client systems, the client system allocations are re-mapped to the existing service capabilities of the virtual datacentres, and routing and signalling instructions are transmitted to elements of the distributed infrastructure to configure interactions between the client system and the virtual datacentres.

According to a second aspect, there is provided a network management system for controlling a distributed computing infrastructure, organised as a plurality of physical datacentres each controlled by a respective resource manager, and a plurality of client systems capable of accessing resources organised to operate as a plurality of virtual datacentres maintained by the physical datacentres, the network management system comprising a service placement manager for co-ordinating and controlling the operation of the resource managers, and a service cell broker for controlling the service placement manager to allocate, for each client system, all its requirements to be met by one of the physical datacentres according to specified requirements of the respective client systems and existing capabilities of the physical datacentres, and in response to changes to the demand profiles of one or more client systems, to reallocate client systems to data centres in accordance to the existing capabilities of the physical datacentres.

The network management system preferably further comprises a configuration engine for reconfiguring the capabilities of the physical datacentres if the service cell broker is unable to identify a mapping that allows each client system to have all its requirements met by a single one or other of the physical datacentres.

Preferably the mapping is arranged so that each client system is allocated to a single physical datacentre for the set of all its service capabilities comprised in its demand profile. In the embodiments to be described, if no mapping is possible between the current client system demand profiles and the existing sets of service capabilities in the datacentres that allows each client system to be mapped to a single physical datacentre, the virtual datacentres are reconfigured such that a mapping can be made.

The invention provides a controller for the delivery of datacentre services in geo-distributed infrastructures supporting "cloud-based" services. It considers the dependencies that exist between virtual datacentre components, and aims to optimize the delivery of datacentre service in geo-distributed cloud infrastructures by minimising latencies between components in virtual datacentres, minimising reconfiguration overheads, and reducing operational and management complexity.

The invention maps the client systems to the physical datacentres' existing capabilities, rather than adapting the individual physical datacentres' capabilities to the changing requirements of the client systems to which they have been previously allocated: thus the capabilities, and not the mappings, are maintained and the mappings, not the capabilities, are dynamic, so as to optimise the allocation of client systems to cells. Reconfiguration and migration of virtual datacentre components (i.e. virtual machines) takes place only if the re-optimization of the existing Virtual Service Cells cannot satisfy the changed demand profiles. The overhead incurred in transferring virtual datacentre components across the network due to changing demand profiles is greatly reduced and the network is used mainly for end-user traffic. The risk of corrupting the state of virtual datacentre components as a result of continuous reconfiguration is also reduced. A constraint is implemented to ensure the complete virtual datacentre for each datacentre service can only be delivered from one Virtual Service Cell (i.e. one physical cloud service provider datacentre) reduces the complexity of the system and minimises the number of sessions to be maintained per enterprise request.

The invention therefore aims to reallocate the mapping of client systems to physical datacenters according to the existing capabilities of the physical datacenters, rather than reconfiguring the physical datacentres themselves to meet the changing needs of the client systems. Thus existing dependencies between virtual datacenter components are considered and key performance requirements such as minimal latency between components in virtual datacentres can be maintained and reconfiguration costs avoided.

The invention may be implemented in software, programming a general-purpose computer to control the network management system and the various components thereof, which may itself be embodied in a distributed computing systems.

BRIEF DESCRIPTION OF THE DRAWINGS

An embodiment of the invention will now be described with reference to the Figures, in which.

DETAILED DESCRIPTION OF PRESENT EXAMPLE EMBODIMENTS

The first and second sets of demand profiles referred to above are specified in detail in Table 1 later in this description.

Figure 1:
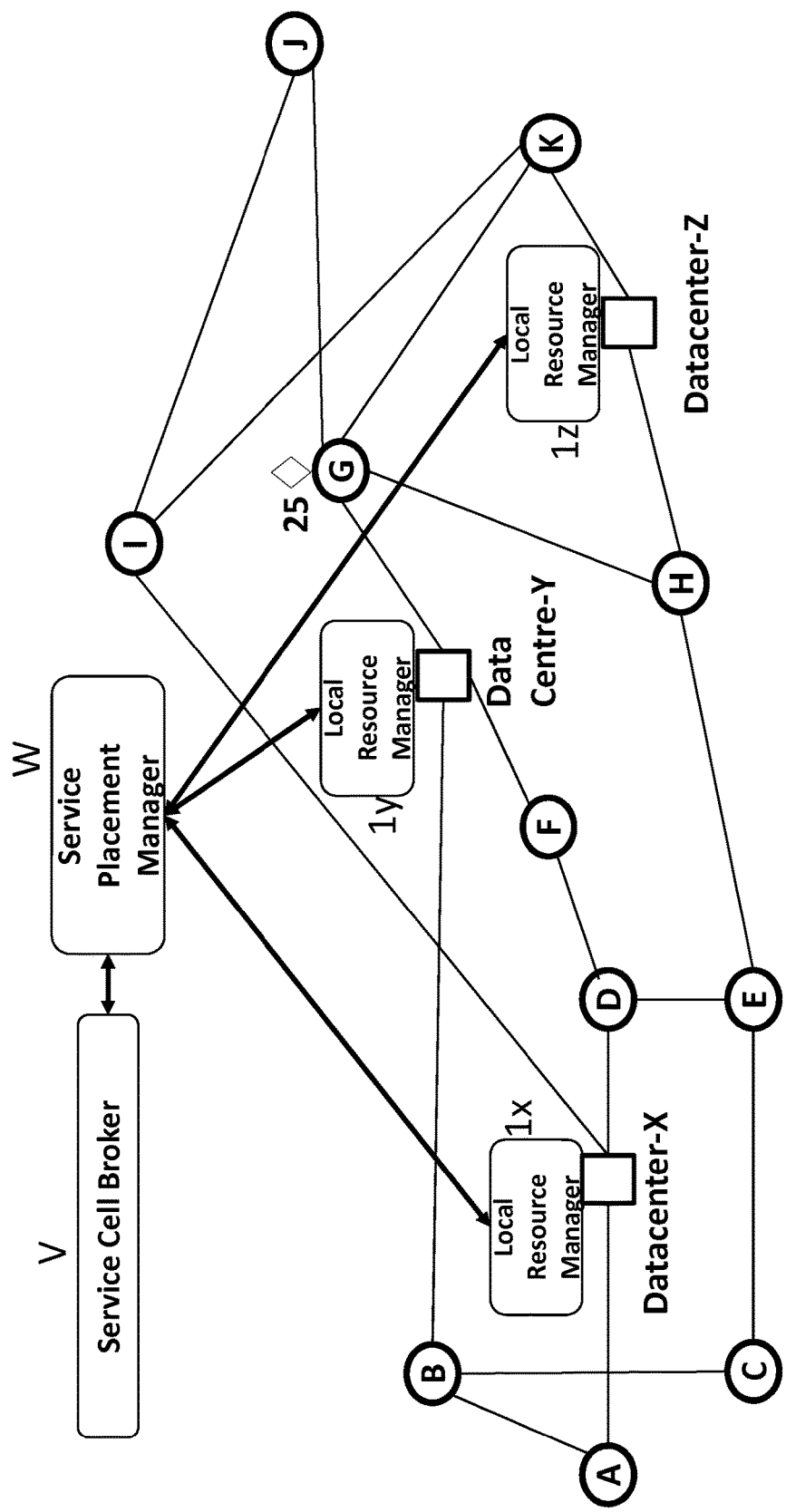
FIG. 1 depicts the Architecture of a Geo-distributed Cloud controlled by a Service Cell Broker according to the invention

FIG. 1 depicts the architecture of a geo-distributed cloud infrastructure having three datacentres X, Y, Z, and a number of network access nodes (labelled A to K) through which individual client systems communicate with the datacentres. Each data centre has a respective local resource management system $1x$, $1y$, $1z$, whose operations are coordinated by a service placement manager W controlled by a Service Cell Broker V operating according to the invention, and as will be described with reference to FIGS. 3, 4 and 5.

Figure 2:
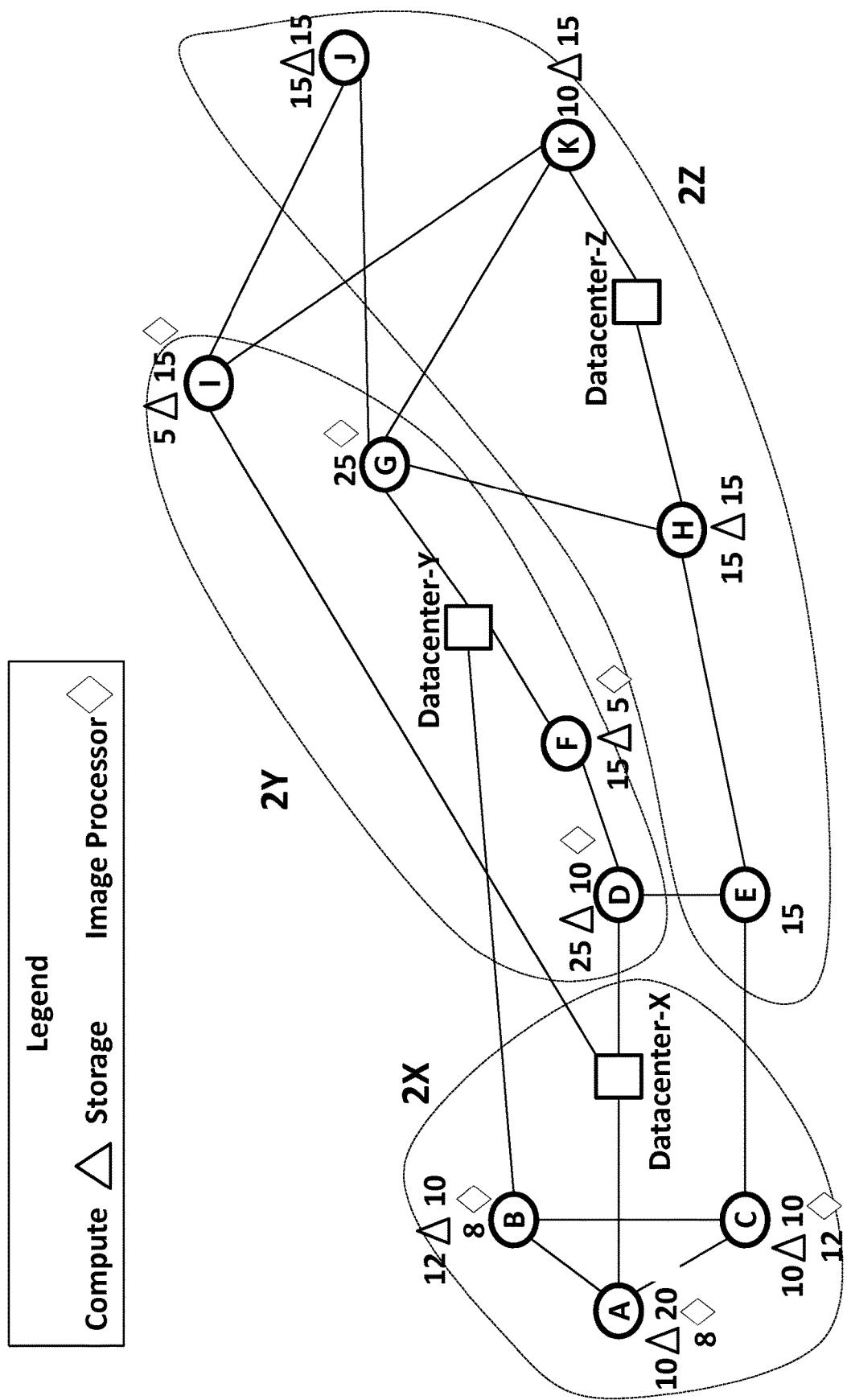
FIG. 2 depicts a distribution of virtual service cells for the Geo-distributed Cloud of FIG. 1 for a first set of demand profiles

FIG. 2 depicts an allocation of the network access nodes (A-K) of FIG. 1 to cells X, Y, Z, according to the requirements of the client systems of each node (A-K). For the purposes of illustration, each node has been assigned a set of service requirements, indicated by symbols as listed in the legend of FIG. 2, the numerical value associated with each symbol at a node indicating the volume (bandwidth, memory etc) of the respective services that it requires.

Figure 6:
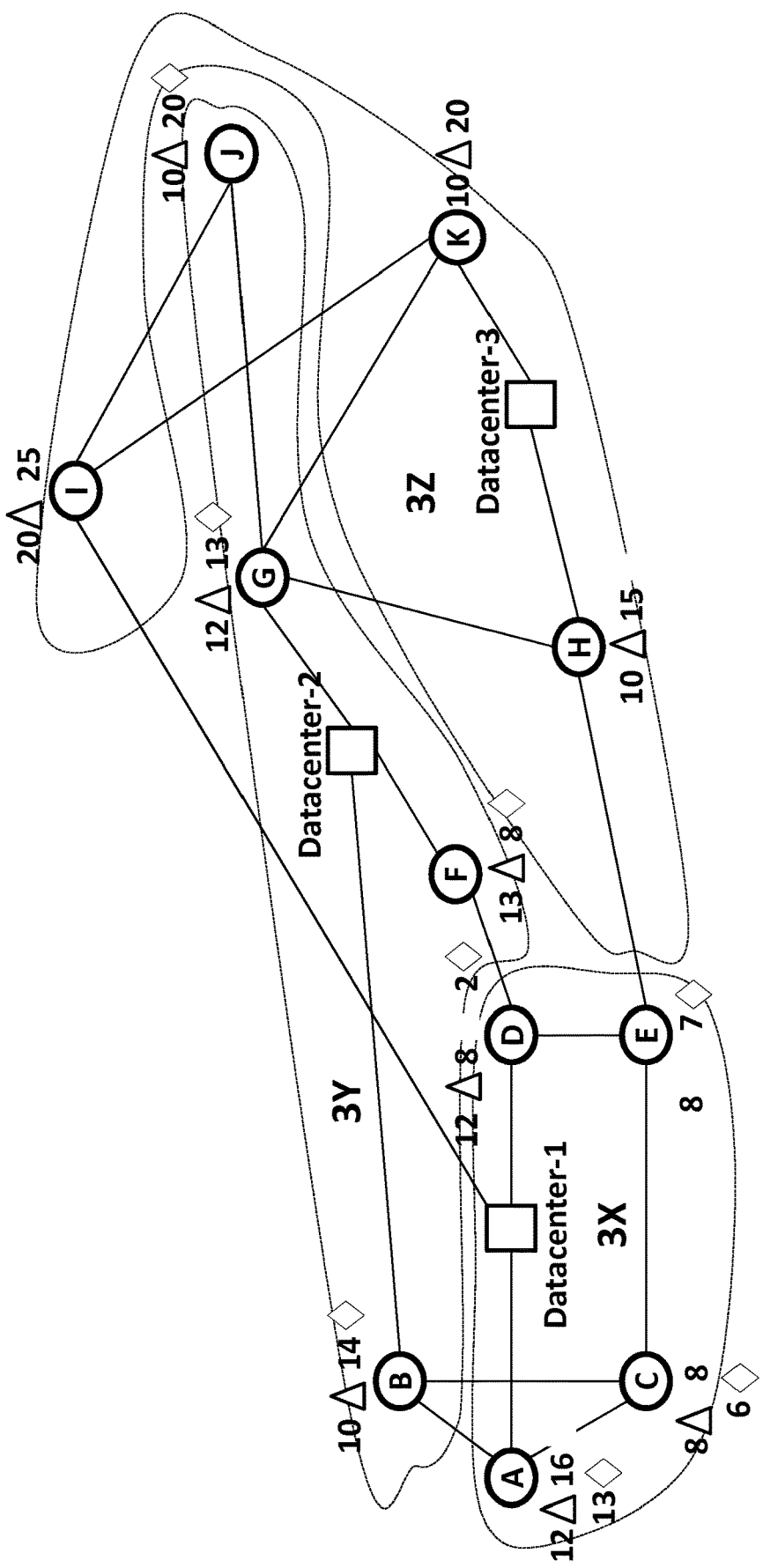
FIG. 6 depicts a distribution of virtual service cells for the Geo-distributed Cloud of FIG. 1 for a second set of demand profiles.

(To avoid duplication with these numerical values, elements appearing in FIGS. 1, 2 and 6 are referenced by letters, or alphanumeric combinations, instead of plain numerals).

As shown in FIG. 2, each network access node is initially allocated to one or other of the datacentres X, Y, Z, thereby forming respective virtual service cells 2X, 2Y, 2Z (The cells are referred to herein as VSC-X, VSC-Y and VSC-Z respectively). In this architecture, a Virtual Service Cell (VSC) refers to a grouping of distributed physical datacentres and enterprises within logical boundaries. These boundaries create deployment constraints such that all virtual datacentre components delivering datacentre services to a given enterprise are to be configured on the physical cloud service provider datacentre within the same VSC as that enterprise.

Although hop distance may be a consideration, it will be noted from FIG. 2 that the virtual cell structure is not constrained by network topology. For example, in FIG. 2, nodes E, H K and J are allocated to VSC-Z, although node "J" cannot communicate with datacentre Z except through nodes in other cells. Similarly, client system node B has been allocated to work with datacentre X which is two hops from it, rather than to datacentre Y to which it has a direct connection.

At start up the capabilities of the individual data centres X, Y, Z can be configured to meet the requirements of the respective client systems A-K with which they are associated. However, these requirements may change over time. In prior art arrangements the changing requirements of individual enterprises have required either that the datacentres X, Y, Z are reconfigured to meet those requirements. This is a complex process and requires major reconfiguration of components. It may also require suspension of a service whilst reconfiguration takes place, or a temporary facility to be established if continuous service is required.

Alternatively, spare capacity may be provided in each VSC when the structure is first set up to accommodate such changes. Another possibility is for one physical datacentre and its associated components to be used to fulfil the additional capacity requirements of another, but this will result in additional latency (delay) as operations are mediated between the physical datacentres involved.

The invention provides automatic and dynamic partitioning of geo-distributed clouds into Virtual Service Cells. This will reduce the rate at which cloud service providers reconfigure the deployment of virtual datacentre components in responses to changes in the demand profiles of enterprise customers. It will also allow cloud service providers to deliver datacentre services to enterprises with minimal latencies between the virtual datacentre components that provide that datacentre service.

Figure 3:
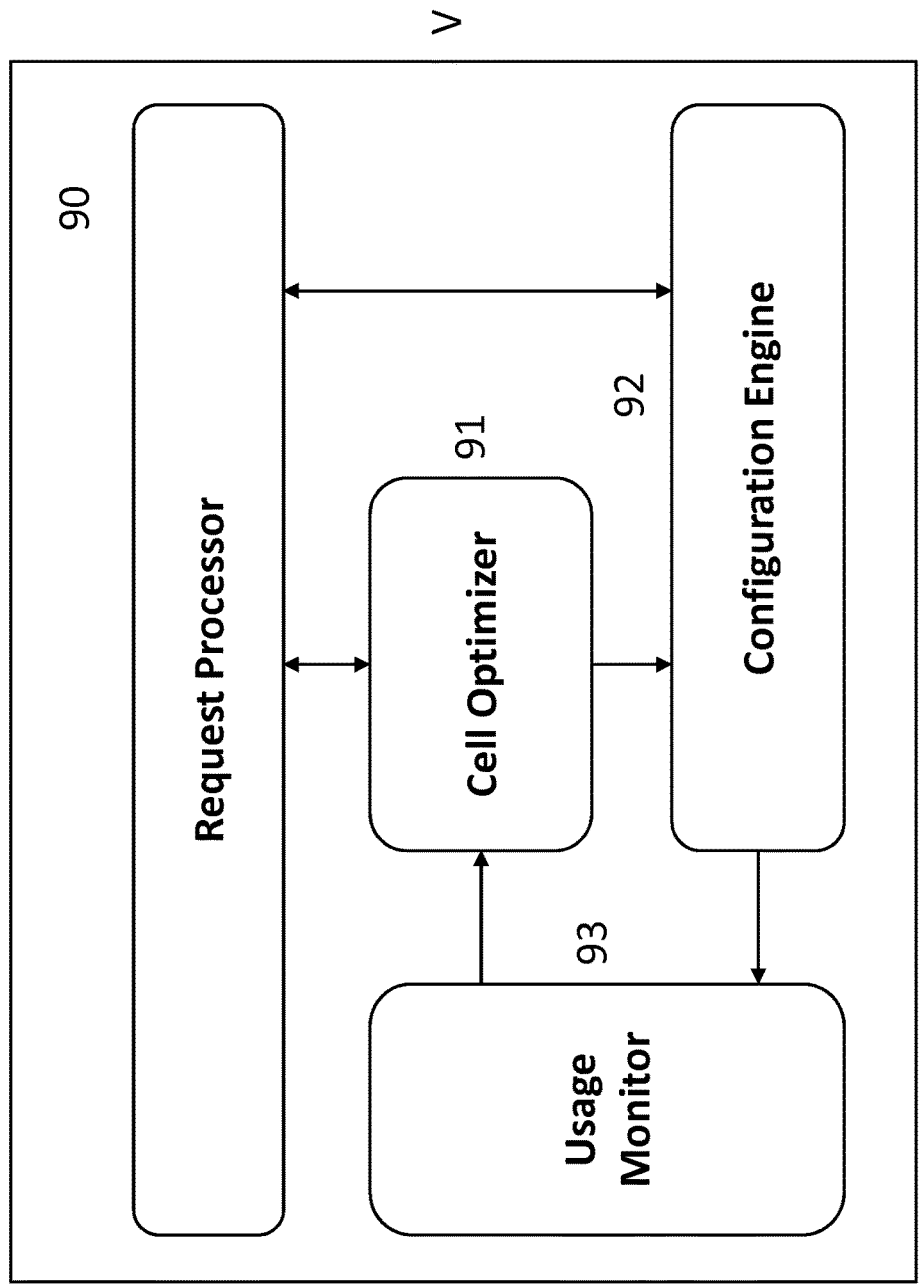
FIG. 3 is a Schematic diagram of a Service cell broker operating according to the invention

FIG. 3 is a schematic representation of the functional elements of the service cell broker V: it will be recognised that these will typically be embodied in software controlling a general-purpose computer. The functional elements comprise a Request Processor 90, a cell optimiser 91, a configuration engine 92 and a usage monitor 93.

The Usage Monitor 93 provides a historical view of demands for datacentre services, by monitoring the overall operation of the network. This historical view can be used to predict the services likely to be used by an enterprise without requiring the enterprise to request them expressly. This avoids the need to expressly request that certain parameters not be changed when other parameters are being updated. Indeed, in a large enterprise, the actual current usage parameters may not be known to any one individual requesting a change in one particular parameter.

The request processor 90, analyses demand profiles from enterprises. These profiles specify the type and capacity of each virtual datacentre component (compute, storage, image processors etc.) to be included in the datacentre service that is delivered by the cloud service provider to the respective enterprises. The Request Processor resolves demand profiles and commands the Configuration Engine 92 to set up and deliver datacentre services to enterprises, using a configuration determined by the Cell Optimizer 91.

The Cell Optimizer 91 is the functional element that processes a set of demand profiles specified by (or on behalf of) individual enterprises through the request processor 90, and combines these with recorded usage trends from the Usage Monitor 93 which provides a historical view of demands for datacentre service. Thus the request processor 90 provides an input indicating the parameters that are to be changed, and the usage monitor 93 provides an input indicating the parameters that have not changed. It should be noted that the cell optimiser handles all the parameters on the same basis, regardless of their origin (90, 93). The detailed operation of the cell optimiser will be discussed later, with reference to FIGS. 4 and 5, The output from the Cell Optimizer is a re-optimization of the logical boundaries of the VSCs 2X, 2Y, 2Z, for example to the distribution 3X, 3Y, 3Z depicted in FIG. 6. The Cell Optimizer does not itself configure or deploy the virtual datacentre components i.e. the virtual machines for compute, storage, image processor etc. on the physical cloud service provider datacentres X, Y, Z. Instead, it takes into consideration already existing configurations i.e. location and/or capacities of deployed virtual datacentre components, and attempts to optimize the boundaries of the VSCs to accommodate the changing demand profiles of the enterprises A-K. If successful, the Cell Optimizer 91 generates an updated VSC template with the mapping of enterprises A-K to VSCs served by cloud service provider datacentres (X, Y, Z). This template is sent to the Configuration Engine 92 which is responsible for configuring and deploying datacentre components to deliver the required services.

The Configuration Engine 92 has two main functions—the generation of enterprise request routing information and the execution of a configuration algorithm. The enterprise request routing information is based on the logical boundaries detailed in VSCs as specified by the cell optimiser 91; it specifies how traffic is forwarded between enterprises and the physical datacentres of cloud service providers. The configuration algorithm is used to determine the location and capacities of datacentre components that are deployed for the delivery of datacentre service to enterprises. In the scenario where the Cell Optimizer 91 is able to generate updated VSCs in response to changes in the demand profiles, the Configuration Engine 92 only needs to generate routing information, and does not require changes to the configurations of virtual datacentre components on physical datacentres X, Y, Z. Instead, the mapping of client system nodes A-K to VSCs X, Y, Z is specified according to the existing capabilities (configurations) of the physical data centres X, Y, Z.

Reconfiguration of the physical datacentres is executed only if the Cell Optimizer 91 is unable to identify an allocation solution using the existing configurations of the datacentres. A special case of this occurs during start-up and initialization, when the datacentre components have no configuration, or all of them have an initial default configuration.

The Configuration Engine 92 forwards request routing and configuration information to the Service Placement Manager W (FIG. 1) which acts as a unified interface to the geo-distributed physical datacentres X, Y, Z in the cloud infrastructure. Each physical cloud service provider datacentre X, Y, Z is managed by a respective Local Resource Manager 1x, 1y, 1z, and the Service Placement Manager W interacts with these Local Resource Managers to configure and deliver datacentre services to enterprises. The information exchanged between the Service Placement Manager W and Local Resource Managers 1x, 1y, 1z include details of virtual datacentre components required to deliver cloud services to enterprises A-K, and routing information to allow communication with the physical datacentres to be used. The Local Resource Manager 1x, 1y, 1z is responsible for creating virtual machine instances for virtual datacentre components using appropriate virtualization technologies, coupling the assigned virtual datacentre components to deliver each complete datacentre service, and provisioning the network path for traffic exchange to/from virtual and physical datacentres based on the request routing information.

Figure 4:
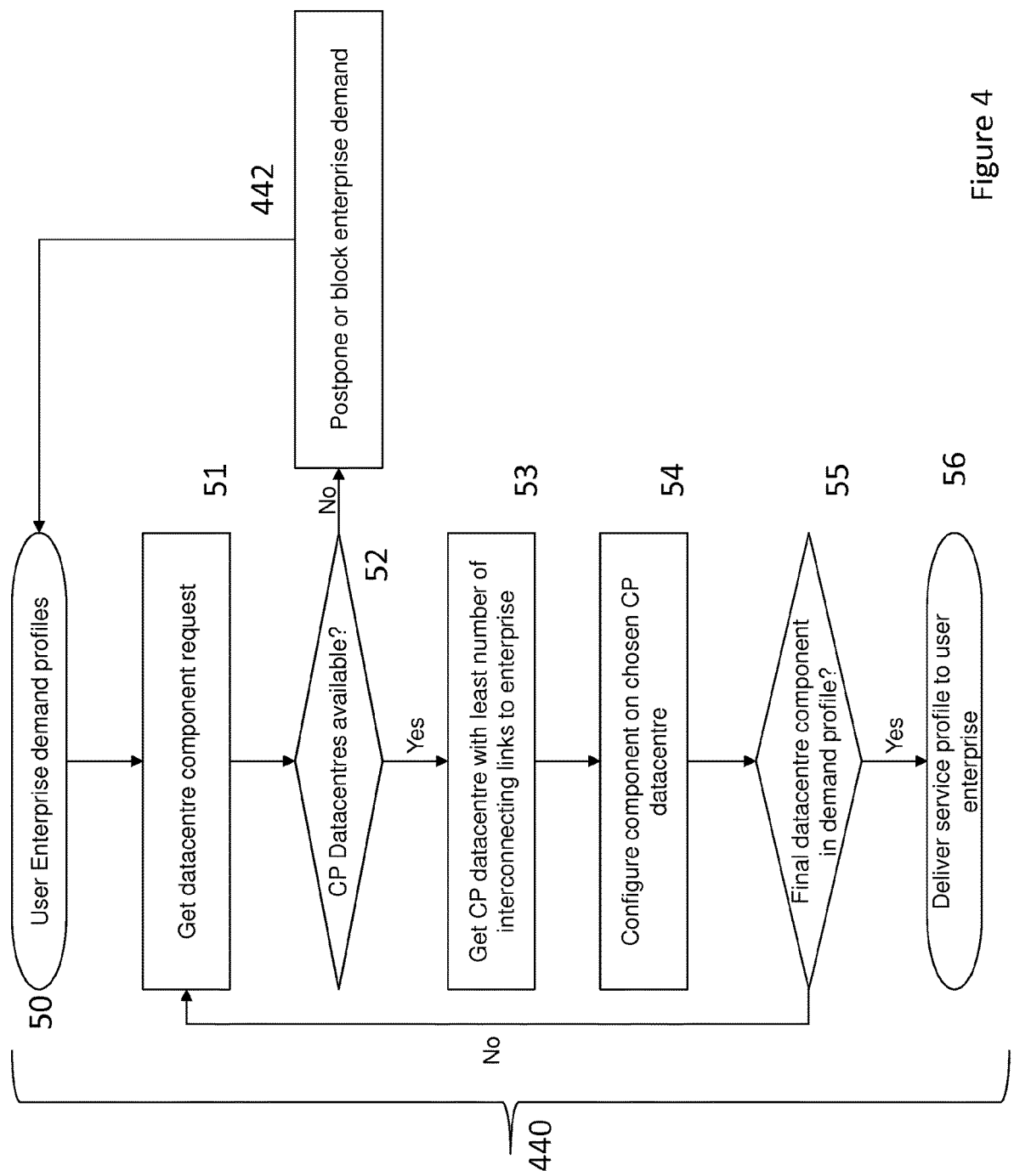
FIG. 4 is a Flowchart representation of a simple conventional heuristic configuration algorithm
Figure 5:
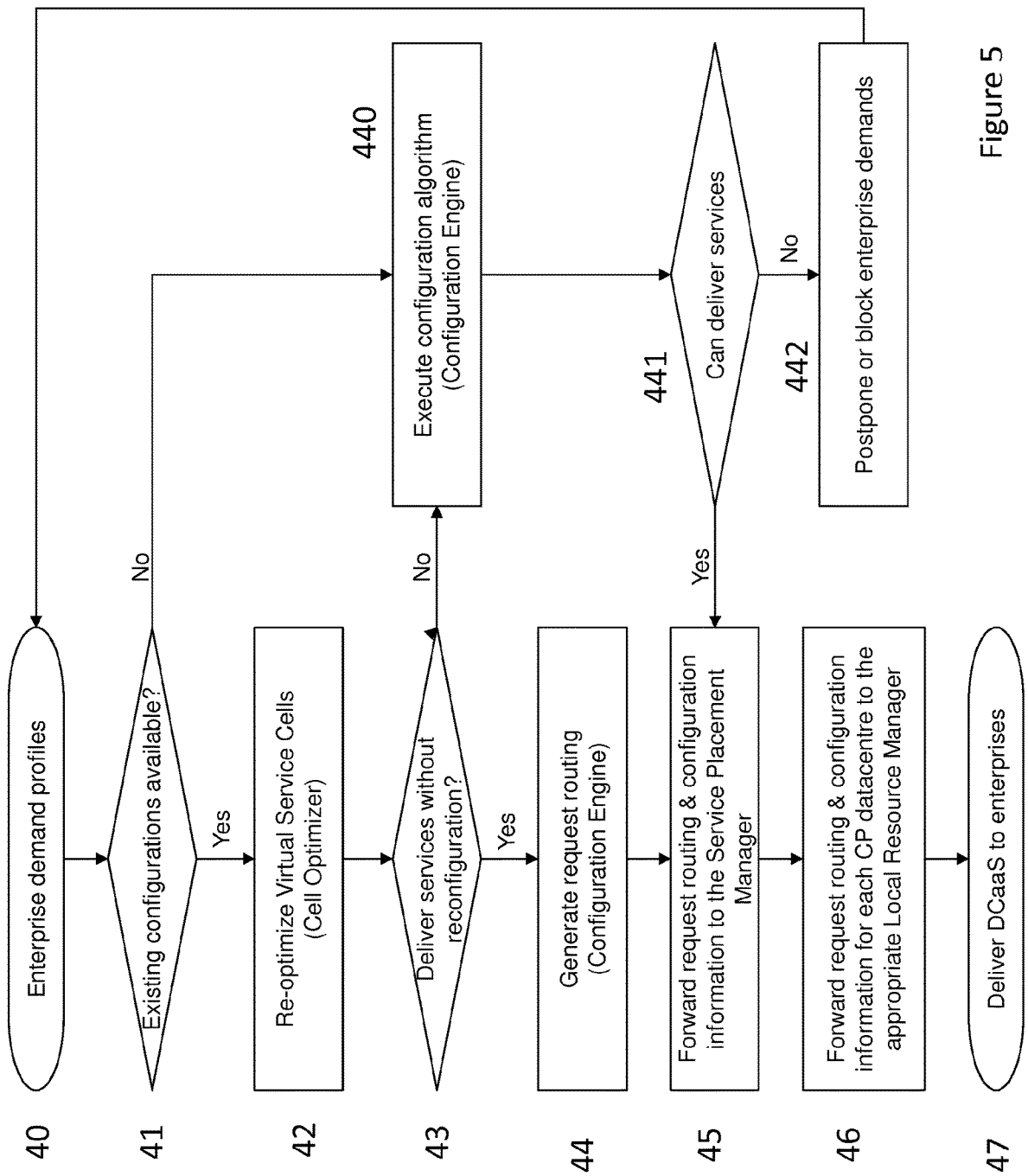
FIG. 5 is a Flowchart high-level representation of the operation of a process according to the invention

FIG. 5 is a flowchart representation of the high-level operation of the service cell broker V depicted in FIG. 3. The request processor 90 receives the demand profiles from the various enterprises requesting them (step 40) and, if the physical cloud service provider infrastructure has previously been configured (step 41), runs the cell optimisation process 42 (to be described in more detail with reference to Equations 1 to 7 below). If the optimiser 91 can provide a solution which requires no reconfiguration of the individual physical datacentres (step 43), a request routing is generated by the configuration engine 92 (step 44). If no such solution is possible using the existing configurations of the datacentres, or if the cloud service provider infrastructure is newly-installed and its elements have not yet been configured, the configuration engine 92 operates to apportion capacity to the individual physical datacentres X, Y, Z in accordance with the demand profiles received by the request processor 90 using the conventional process depicted in FIG. 4 (step 440). If no solution is possible even with such a modified configuration (step 441) the request for capacity is declined i.e. postponed or blocked (step 442).

The process 440 of FIG. 4 is used if it is not possible to re-assign each client system node A to K to one of the datacentres X, Y or Z. The request processor 90 receives the demand profiles from the various enterprises (client systems) A-K requesting them (step 50). Each client system's demand profile will typically include a number of components (e.g computing, storage, image processing).

The configuration engine considers each component in turn (steps 51-55). They are prioritised so that in the event that there is insufficient capacity in the physical datacentres, (step 52) and some of the capacity requirements have to remain unfulfilled (step 442), it is the lowest priority requirements that are postponed or refused.

Whilst capacity is available, for each component of the demand profile the configuration engine identifies the physical datacentre closest to the user node in the network topology that has sufficient capacity (steps 52, 53) and configures the physical datacentre with the capability required (step 54). In general, the physical datacentre selected (step 53) will be the same for each capability in a given client system's demand profile, because of the "least number of interconnecting links" criterion. However, if a previous iteration used all the remaining capacity in the nearest physical datacentre, it will become "unavailable" for further iterations so the "nearest available" physical datacentre to that client system will be different on that subsequent iteration. Once all components of the demand profile for a given client system have been allocated—in general to a single physical datacentre (step 55)—the service profile is delivered to the client system (step 56).

The routing and/or configuration information generated by the configuration engine 92 (steps 44, 56) is forwarded to the service placement manager W (step 45) and thus to the respective local resource managers 1x, 1y, 1z. (step 46) which modify routing information and, if necessary, configuration data in the individual datacentres X, Y, Z)

By automatically and dynamically optimizing the boundaries of VSCs in geo-distributed clouds, the Cell Optimizer 91 aims to reduce the need to reconfigure the location and capacity of virtual datacentre components when cloud service providers respond to changes in the demand profiles of enterprises.

The operation of the Cell Optimizer 91 (step 42) can be represented as an optimization problem with the following parameters and variables:

V is the set of VSCs

D is the set of geo-distributed physical datacentres in the cloud infrastructure N is the set of enterprise customers M is the set of virtual datacentre components offered by the cloud service provider i.e. compute, storage, image processor, media server etc.

$H_{max}$ is a positive integer value representing the maximum number of links that can exist on the network path interconnecting enterprises and cloud service provider physical datacentres within the same VSC.

$C(i,j)$ is a positive decimal value indicating the total capacity of virtual datacentre component that is configured on physical datacentre j.

$R(i,j)$ is a positive decimal value representing the capacity of virtual datacentre component i which is specified in the demand profile of enterprise j.

$X(i,j)$ is a binary variable which equals 1 if the virtual datacentre service for enterprise i is to be delivered by cloud service provider datacentre j and equals 0 otherwise.

$E(i,j)$ is a positive integer value representing the number of links on the network path connecting an enterprise i to the cloud service provider datacentre j delivering a virtual datacentre service to the enterprise.

$k(i,j)$ is a binary variable which equals 1 if physical datacentre i is a member of VSC j and 0 otherwise.

The objective function of the Cell Optimizer is expressed in Equation 1. This function aims to minimize the number of enterprises that do not receive virtual datacentre service from the cloud service provider.

$$\min \sum_{i=1}^{M} \sum_{j}^{N} (K_{(i,j)} - F_{(i,j)}) \quad (1)$$

Where $F(i,j)$ represents demands which have been accepted by the Cell Optimizer $$F_{(i,j)} = R_{(i,j)} \sum_{k=1}^{D} X_{(j,k)} \quad (2)$$

This objective function is subject to the following constraints:

Equation 3—the total capacity of virtual datacentre component delivered by a physical datacentre cannot exceed the capacity of the virtual datacentre component that has been configured on the physical datacentre.

$$\forall i \in M, \forall j \in D; \sum_{k=1}^{N} R_{(i,k)} X_{(k,j)} \leq C_{(i,j)} \quad (3)$$

Equation 4—at any given time, a physical datacentre can only belong to one VSC.

$$\forall\, i \in D, \sum_{j=1}^{V} K_{(i,j)} = 1 \qquad (4)$$

Equation 5—an enterprise can only receive its service from one physical datacentre if the provider is able to accommodate its demand profile.

$$\forall\, i \in N, \sum_{j=1}^{D} X_{(i,j)} \leq 1 \qquad (5)$$

Equation 6—the number of links on the network path interconnecting an enterprise and the physical datacentre delivering service to this enterprise must not exceed the maximum allowed number of links for network paths in VSCs $$\forall i \in N, \forall j \in D, 0 \leq E_{(i,j)} \leq H_{max} \qquad (6)$$

Equation 7—virtual datacentre service can only be delivered to an enterprise if the service provider is able to accommodate all its demands for datacentre components e.g. an enterprise requesting compute and storage in its virtual datacentre will never get a virtual datacentre with only compute components.

$$\forall\, i \in N, \sum_{j=1}^{D} \sum_{k=1}^{M} R_{(k,i)} \cdot X_{(i,j)} = \sum_{k=1}^{M} R_{(k,i)} \left\{ \text{if } \sum_{j=1}^{D} X_{(i,j)} = 1 \right. \qquad (7)$$

The following is a simplified worked example of the process of FIG. 5, as applied to the network of FIG. 1, contrasting it with a simple heuristic algorithm of the kind depicted in FIG. 4 that independently deploys each datacentre component in the demand profile of an enterprise.

As previously discussed, FIG. 1 shows a geo-distributed cloud infrastructure comprising of three physical cloud service provider datacentres X, Y, Z. For comparison, FIG. 4 is a flowchart representation of a heuristic algorithm which simply aims to minimize the latency between all datacentre components in the same demand profile. It achieves this objective by configuring datacentre components on physical datacentres that require the least number of links to interconnect with the enterprise customer. In this demonstration, three datacentre components are available—compute, storage, and image processor—for the delivery of virtual datacentre service to its enterprise customers. These are depicted in FIG. 2 by symbols (triangle, square and diamond respectively). For tractability, enterprise customers are represented by the network access nodes in the infrastructure i.e. nodes A-K. To compare the invention with the simple heuristic algorithm depicted in FIG. 4, the demand profiles for two scenarios are depicted. These profiles are presented in Table 1; in which these demands are expressed as capacities and each physical cloud datacentre in the geo-distributed cloud has a total capacity of 100.

TABLE 1

Demand Profiles for Enterprise Customers

|  | Scenario 1 | | | Scenario 2 | | |
| --- | --- | --- | --- | --- | --- | --- |
|  | Compute | Storage | Image Processor | Compute | Storage | Image Processor |
| Node A | 10 | 20 | 8 | 12 | 16 | 13 |
| Node B | 12 | 10 | 8 | 10 | — | 14 |
| Node C | 10 | 10 | 12 | 8 | 8 | 6 |
| Node D | 25 | — | 10 | 12 | 8 | 2 |
| Node E | — | 15 | — | — | 8 | 7 |
| Node F | 15 | — | 5 | 13 | — | 8 |
| Node G | — | — | 25 | 12 | — | 13 |
| Node H | 15 | 15 | — | 10 | 15 | — |
| Node I | 5 | — | 15 | 20 | 25 | — |
| Node J | 15 | 15 | — | 10 | — | 20 |
| Node K | 10 | 15 | — | 10 | 20 | — |

Scenarios 1 and 2 both start with an arbitrary configuration of datacentre components, presented in Table 2, which is to be used by the invention.

TABLE 2

Datacentre Component Configurations for Cell Optimizer

|  | Compute | Storage | Image Processor |
| --- | --- | --- | --- |
| Datacentre X | 32 | 40 | 28 |
| Datacentre Y | 45 | — | 55 |
| Datacentre Z | 40 | 60 | — |

In contrast, the simple heuristic algorithm of the kind depicted in FIG. 4 starts without any preconfigured datacentre components, and the processes build their configurations of datacentre components following the delivery of virtual datacentre services for the demand profiles in Scenario 1.

The process of Equations 1 to 7 and FIG. 5 aims to create three VSCs for the geo-distributed cloud with $H_{max}$ set to 4 i.e. the maximum number of links that can exist on the network path interconnecting enterprises and cloud service provider datacentres within the same VSC. The VSCs formed for Scenario 1 are depicted in FIG. 2 and the virtual datacentre service delivery metrics for the processes of FIG. 4 and FIG. 5 respectively are presented in Table 1.2. Tables 4A and 4B provide more detailed service delivery information for the simple heuristic algorithm of FIG. 4, and for the optimisation process according to the invention depicted in FIG. 5 respectively.

TABLE 3

Scenario 1 Link Metrics for Heuristic Algorithm and VSC Optimization

|  | Heuristic Algorithm | | VSC Optimization | |
| --- | --- | --- | --- | --- |
|  | Max Link Count | Mean Link Count | Max Link Count | Mean Link Count |
| Datacentre X | 2 | 1.25 | 2 | 1.67 |
| Datacentre Y | 2 | 1.25 | 3 | 1.75 |
| Datacentre z | 3 | 1.67 | 3 | 1.75 |

TABLE 4A

Scenario 1 Datacentre service Delivery
with Heuristic Algorithm

|        | Component       | Capacity Configured | Datacentre |
|--------|-----------------|---------------------|------------|
| Node A | Compute         | 10                  | X - -      |
|        | Storage         | 20                  | X - -      |
|        | Image Processor | 8                   | X - -      |
| Node B | Compute         | 12                  | - Y -      |
|        | Storage         | 10                  | - Y -      |
|        | Image Processor | 8                   | - Y -      |
| Node I | Compute         | 5                   | X - -      |
|        | Image Processor | 15                  | X - -      |
| Node D | Compute         | 25                  | X - -      |
|        | Image Processor | 10                  | X - -      |
| Node F | Compute         | 15                  | - Y -      |
|        | Image Processor | 5                   | - Y -      |
| Node G | Image Processor | 25                  | - Y -      |
| Node H | Compute         | 15                  | - - Z      |
|        | Storage         | 15                  | - - Z      |
| Node K | Compute         | 10                  | - - Z      |
|        | Storage         | 15                  | - - Z      |
| Node C | Compute         | 7                   | X - -      |
|        | Compute         | 3                   | - - Z      |
|        | Storage         | 10                  | - - Z      |
|        | Image Processor | 12                  | - - Z      |
| Node E | Storage         | 15                  | - - Z      |
| Node J | Compute         | 10                  | - Y -      |
|        | Compute         | 5                   | - - Z      |
|        | Storage         | 15                  | - Y -      |

TABLE 4B

Scenario 1 Datacentre service Delivery
with VSC Optimisation

|        | Component       | Capacity Configured | Datacentre |
|--------|-----------------|---------------------|------------|
| Node A | Compute         | 10                  | X - -      |
|        | Storage         | 20                  | X - -      |
|        | Image Processor | 8                   | X - -      |
| Node B | Compute         | 12                  | X - -      |
|        | Storage         | 10                  | X - -      |
|        | Image Processor | 8                   | X - -      |
| Node I | Compute         | 5                   | - Y -      |
|        | Image Processor | 15                  | - Y -      |
| Node D | Compute         | 25                  | - Y -      |
|        | Image Processor | 10                  | - Y -      |
| Node F | Compute         | 15                  | - Y -      |
|        | Image Processor | 5                   | - Y -      |
| Node G | Image Processor | 25                  | - Y -      |
| Node H | Compute         | 15                  | - - Z      |
|        | Storage         | 15                  | - - Z      |
| Node K | Compute         | 10                  | - - Z      |
|        | Storage         | 15                  | - - Z      |
| Node C | Compute         | 10                  | X - -      |
|        | Storage         | 10                  | X - -      |
|        | Image Processor | 12                  | X - -      |
| Node E | Storage         | 15                  | - - Z      |
| Node J | Compute         | 15                  | - - Z      |
|        | Storage         | 15                  | - - Z      |

The values presented in Table 3 compare the maximum and mean number of links interconnecting enterprises A-K with datacentres X, Y, Z. These values show that, without a constraint to choose the shortest available network path to interconnect enterprises and datacentres, the process of FIG. 4 nevertheless achieves similar network usage as an algorithm which explicitly aims to minimize network link usage.

Table 5 lists the client systems that have virtual datacentre components configured by the heuristic algorithm of FIG. 4 across multiple physical datacentres.

TABLE 5

Scenario 1 Datacentre Usage Metrics
for Heuristic Algorithm

|        | Datacentres Used |
|--------|------------------|
| Node C | XZ               |
| Node J | YZ               |

The distribution of datacentre components across multiple physical datacentres can have profound performance effects due to latency between these datacentres as well as the complexity of managing the workflow of end-user applications. The process according to the invention is able to deliver each client system A-K from a single physical datacentre.

It will be seen that two client systems have virtual datacentre components distributed across multiple physical datacentres when using only the heuristic algorithm of FIG. 4.

For Scenario 2, the heuristic algorithm of FIG. 4 has built its configuration of virtual datacentre components across physical datacentres following the delivery of virtual datacentre services in Scenario 1. It responds to changing demand profiles by generating new request routing only. That is to say, the heuristic algorithm will not change the location or capacities of datacentre components, but continues to use the same configuration of datacentre components presented in Table 2. Table 6 shows the datacentre components configuration generated by the heuristic algorithm in Scenario 1 which will be used to respond to the demand profiles in Scenario 2.

TABLE 6

Datacentre Component Configurations
for Heuristic Algorithm

|              | Compute | Storage | Image Processor |
|--------------|---------|---------|-----------------|
| Datacentre X | 47      | 20      | 33              |
| Datacentre Y | 42      | 25      | 38              |
| Datacentre Z | 33      | 55      | 12              |

The same virtual datacentre service delivery metrics were observed for Scenario 2 and are presented in Table 7. The values in Table 7 compare the maximum and mean number of links interconnecting individual enterprises with physical datacentres operated by the cloud service provider. These values show the re-zoning by the process according to the invention outperforms the heuristics algorithm in terms of network link usage even without an explicit constraint to minimize the number of links.

TABLE 7

Scenario 2 Datacentre service Link Metrics
for Heuristic Algorithm and VSC Optimization

|              | Heuristic Algorithm | | VSC Optimization | |
|--------------|---------------------|----------------|-------------------|-----------------|
|              | Max Link Count      | Mean Link Count | Max Link Count   | Mean Link Count |
| Datacentre X | 2                   | 1.4            | 2                 | 1.5             |
| Datacentre Y | 4                   | 2              | 2                 | 1.25            |
| Datacentre Z | 3                   | 2              | 2                 | 1.33            |

Tables 8A and 8B (on the following pages) provide more detailed virtual datacentre service delivery information for Scenario 2. It will be seen that when using the heuristic algorithm of FIG. 4, six client systems now have datacentre components distributed across multiple datacentres, as summarised in Table 9.

TABLE 9

Scenario 2 Datacentre Usage Metrics for Heuristic Algorithm

|  | Datacentres Used |
|---|---|
| Node I | XZ |
| Node D | XY |
| Node K | YZ |
| Node C | XYZ |
| Node E | YZ |
| Node J | XYZ |

The number of enterprises as well as the maximum number of cloud service provider datacentres used has now increased. In contrast the process of FIG. 5 is still able to deliver each client system A-K with virtual datacentre services from a single cloud service provider physical datacentre X, Y or Z, despite the changes to the demand profiles in Scenario 2. This is achieved using the re-defined optimised VSC boundaries shown in FIG. 6.

TABLE 8A

Scenario 2 Datacentre service Delivery with Heuristic Algorithm

|  | Component | Capacity Configured | Datacentre |
|---|---|---|---|
| Node A | Compute | 12 | X - - |
|  | Storage | 16 | X - - |
|  | Image Processor | 13 | X - - |
| Node B | Compute | 10 | - Y - |
|  | Image Processor | 14 | - Y - |
| Node I | Compute | 20 | X - - |
|  | Storage | 4 | X - - |
|  | Storage | 21 | - - Z |
| Node D | Compute | 12 | X - - |
|  | Storage | 8 | - Y - |
|  | Image Processor | 2 | X - - |
| Node F | Compute | 13 | - Y - |
|  | Image Processor | 8 | - Y - |
| Node G | Compute | 12 | - Y - |
|  | Image Processor | 13 | - Y - |
| Node H | Compute | 10 | - - Z |
|  | Storage | 15 | - - Z |
| Node K | Compute | 10 | - - Z |
|  | Storage | 1 | - Y - |
|  | Storage | 19 | - - Z |
| Node C | Compute | 3 | X - - |
|  | Compute | 5 | - - Z |
|  | Storage | 8 | - Y - |
|  | Image Processor | 6 | X - - |
| Node E | Storage | 8 | - Y - |
|  | Image processor | 7 | - - Z |
| Node J | Compute | 2 | - Y - |
|  | Compute | 8 | - - Z |
|  | Image Processor | 12 | X - - |
|  | Image Processor | 3 | - Y - |
|  | Image Processor | 5 | - - Z |

TABLE 8B

Scenario 2 Datacentre service Delivery with VSC Optimisation

|  | Component | Capacity Configured | Datacentre |
|---|---|---|---|
| Node A | Compute | 12 | X - - |
|  | Storage | 16 | X - - |
|  | Image Processor | 13 | X - - |
| Node B | Compute | 10 | - Y - |
|  | Image Processor | 14 | - Y - |
| Node I | Compute | 20 | - - Z |
|  | Storage | 25 | - - Z |
| Node D | Storage | 8 | X - - |
|  | Image Processor | 2 | X - - |
| Node F | Compute | 13 | - Y - |
|  | Image Processor | 8 | - Y - |
| Node G | Compute | 12 | - Y - |
|  | Image Processor | 13 | - Y - |
| Node H | Compute | 10 | - - Z |
|  | Storage | 15 | - - Z |
| Node K | Compute | 10 | - - Z |
|  | Storage | 20 | - - Z |
| Node C | Compute | 8 | X - - |
|  | Storage | 8 | X - - |
|  | Image Processor | 6 | X - - |
| Node D | Compute | 12 | X - - |
| Node E | Storage | 8 | X - - |
|  | Image Processor | 7 | X - - |
| Node J | Compute | 10 | - Y - |
|  | Image Processor | 20 | - Y - |

The invention claimed is:

1. A method of controlling a distributed computing infrastructure, organised as a plurality of physical datacentres, and a plurality of client systems capable of accessing resources of the physical datacentres operating as a plurality of virtual datacentres, wherein, for each client system, resources are allocated to one of the physical datacentres according to a mapping between a specified demand profile of the respective client system and existing capabilities of the physical datacentre, and in response to changes to the demand profiles of one or more client systems, client systems are reallocated to data centres by mapping the new demand profiles to the existing capabilities of the physical datacentres.

2. A method according to claim 1 wherein the mapping and reallocation are arranged so that each client system is allocated to a single physical datacentre for the set of all service capabilities currently comprised in the demand profile of that client system.

3. A method according to claim 2 wherein, if no mapping is possible between the current client system demand profiles and the existing sets of service capabilities in the datacentres that allows each client system to be mapped to a single physical datacentre, the virtual datacentres running on the physical datacenters are reconfigured such that a new mapping can be made.

4. A method according to claim 1 further comprising optimizing logical boundaries of the virtual datacentres to accommodate the changes to the demand profiles of the one or more client systems such that a mapping of at least one of the client systems to one of the virtual datacentres is re-defined to a different one of the virtual datacentres.

5. A network management system for controlling a distributed computing infrastructure, organised as a plurality of physical datacentres each controlled by a respective resource manager, and a plurality of client systems capable of accessing resources of the physical datacentres operating as a plurality of virtual datacentres, the network management system comprising a service placement manager for coordinating and controlling the operation of the resource managers, and
   a service cell broker for controlling the service placement manager to allocate each client system, to a respective one of the physical datacentres to meet all the requirements of that client system according to a mapping between a specified demand profile of the respective client system and existing capabilities of the physical datacentre, and in response to changes to the demand profiles of one or more client systems, client systems are reallocated to datacentres by mapping the new demand profiles to the existing capabilities of the physical datacentres.

6. A network management system according to claim 5 further comprising a configuration engine for reconfiguring the capabilities of the physical datacentres if the service cell broker is unable to identify a mapping that allows each client system to have all requirements of that client system met by a single one or other of the physical datacentres.

7. A network management system according to claim 5 further comprising a cell optimizer configured to optimize logical boundaries of the virtual datacentres to accommodate the changes to the demand profiles of the one or more client systems such that a mapping of at least one of the client systems to one of the virtual datacentres is re-defined to a different one of the virtual datacentres.

8. A computer program or suite of computer programs executable by a processor to cause the processor to perform the method of claim 1.

\* \* \* \* \*